(12) United States Patent
Fujioka et al.

(10) Patent No.: US 11,220,998 B2
(45) Date of Patent: Jan. 11, 2022

(54) WIND TURBINE BLADE, WIND TURBINE ROTOR, AND WIND TURBINE POWER GENERATING APPARATUS

(71) Applicant: MHI VESTAS OFFSHORE WIND A/S, Aarhus N (DK)

(72) Inventors: Hideyasu Fujioka, Aarhus N (DK); Masayuki Hiraishi, Aarhus N (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 173 days.

(21) Appl. No.: 16/484,568

(22) PCT Filed: Mar. 21, 2017

(86) PCT No.: PCT/EP2017/056717
§ 371 (c)(1),
(2) Date: Aug. 8, 2019

(87) PCT Pub. No.: WO2018/171874
PCT Pub. Date: Sep. 27, 2018

(65) Prior Publication Data
US 2020/0011300 A1    Jan. 9, 2020

(51) Int. Cl.
*F03D 3/06* (2006.01)
*F03D 9/25* (2016.01)
(Continued)

(52) U.S. Cl.
CPC .............. *F03D 9/25* (2016.05); *F01D 5/286* (2013.01); *F03D 1/0675* (2013.01); *F03D 3/062* (2013.01); *H02K 7/183* (2013.01)

(58) Field of Classification Search
CPC .......... F03D 9/25; F03D 1/0675; F03D 3/062; F01D 1/0675; F01D 5/286; Y02P 70/50;
(Continued)

(56) References Cited

U.S. PATENT DOCUMENTS

2004/0096331 A1* 5/2004 Leach ................. C09D 175/04
416/224
2011/0142678 A1 6/2011 Santiago et al.
(Continued)

FOREIGN PATENT DOCUMENTS

CN     201786551 U    4/2011
EP     3144525 A1     3/2017
(Continued)

OTHER PUBLICATIONS

Europe Patent Office, "Office Action for European Patent Application No. 17712757.8," dated Jul. 17, 2020.
(Continued)

*Primary Examiner* — Aaron R Eastman
(74) *Attorney, Agent, or Firm* — Patterson + Sheridan, LLP

(57) ABSTRACT

A wind turbine blade includes: a blade body portion; and an anti-erosion layer disposed so as to cover a surface of the blade body portion partially. A center point of the anti-erosion layer in a circumferential length direction along a blade profile in a cross section orthogonal to a blade spanwise direction is shifted toward a pressure side from a leading edge of the blade body portion, at least in a part of an extension range of the anti-erosion layer in the blade spanwise direction.

14 Claims, 9 Drawing Sheets

(51) Int. Cl.
*H02K 7/18* (2006.01)
*F01D 5/28* (2006.01)
*F03D 1/06* (2006.01)

(58) Field of Classification Search
CPC ............ F05B 2240/303; F05B 2230/90; F05B 2240/30; Y02E 10/74; Y02E 10/72
See application file for complete search history.

(56) References Cited

U.S. PATENT DOCUMENTS

| 2014/0186188 | A1 | 7/2014 | Industries | |
| 2015/0337447 | A1* | 11/2015 | Gatley | C25D 1/00 428/660 |
| 2019/0277247 | A1* | 9/2019 | Kratmann | F03D 80/00 |

FOREIGN PATENT DOCUMENTS

| JP | 2010-234989 A | 10/2010 |
| JP | 2014-051921 A | 3/2014 |
| JP | 2016-041916 A | 3/2016 |
| JP | 2016-079905 A | 5/2016 |
| WO | 81/00993 A1 | 4/1981 |
| WO | 2014/102957 A1 | 7/2014 |

OTHER PUBLICATIONS

China Patent Office, "Office Action for Chinese Patent Application No. 201780088447.0," dated Jun. 3, 2020.

Japan Patent Office, "Office Action for Japanese Patent Application No. 2019-543385," dated Sep. 15, 2020.

Korea Patent Office, "Office Action for Korean Patent Application No. 10-2019-7023019," dated Aug. 28, 2020.

PCT, "International Search Report for International Patent Application No. PCT/EP2017/056717," dated Dec. 13, 2017.

* cited by examiner

WIND TURBINE BLADE, WIND TURBINE ROTOR, AND WIND TURBINE POWER GENERATING APPARATUS

RELATED APPLICATIONS

The present application is National Phase of International Application No. PCT/EP2017/056717 filed Mar. 21, 2017, the disclosure of which is hereby incorporated by reference herein in its entirety.

TECHNICAL FIELD

The present invention relates to a wind turbine blade, a wind turbine rotor, and a wind turbine power generating apparatus.

BACKGROUND ART

It has been known that a wind turbine blade collides with foreign substances in the air (e.g. raindrops, dusts) and gets eroded, accompanying rotation of a wind turbine rotor, thus resulting in occurrence of erosion on a leading-edge side of the wind turbine blade. To protect a wind turbine blade from erosion, an anti-erosion protection layer is attached or applied to the leading-edge side of the wind turbine blade. For instance, Patent Document 1 discloses a wind turbine rotor provided with a wind turbine blade covered with an erosion protection coating including a ceramic layer on the leading edge.

Meanwhile, a wind turbine blade has a suction-surface side (suction side) and a pressure-surface side (pressure side) defined across the leading edge and the trailing edge, and the frequency of collision with foreign substances and the extent of development of erosion upon rotation are not always uniform on the suction side and the pressure side of the wind turbine blade. Specifically, depending on the influence from wind direction and the pitch-angle control corresponding to the operational conditions of the wind turbine power generating apparatus, for instance, erosion tends to develop to a greater extent on the pressure side than on the suction side of the wind turbine blade across the leading edge, in a cross section orthogonal to the blade spanwise direction of the wind turbine blade.

Furthermore, the blade body of the wind turbine blade is formed from a light-weight material with an excellent mechanical strength such as FRP. If an anti-erosion protection layer is applied to a greater area of the blade body, the merit of FRP cannot be fully achieved, and even worse, the costs increase. Thus, an anti-erosion protection layer should be applied only to a portion of the wind turbine blade in need of protection so as to cover a minimum possible area.

CITATION LIST

Patent Literature

Patent Document 1: US 2011/0142678A

SUMMARY

Problems to be Solved

However, the erosion protection coating applied to the rotor disclosed in Patent Document 1 is disposed so as to have the same application width on the suction side and the pressure side centered at the leading edge, which may lead to failure to protect the wind turbine blade appropriately from erosion, or to undesirable application of the erosion protection coating to a portion where protection is not needed.

An object of at least some embodiments of the present invention is to protect a wind turbine blade from erosion appropriately.

Solution to the Problems (1) A wind turbine blade according to at least one embodiment of the present invention comprises: a blade body portion; and an anti-erosion layer disposed so as to cover a surface of the blade body portion partially. A center point of the anti-erosion layer in a circumferential length direction along a blade profile in a cross section orthogonal to a blade spanwise direction is shifted toward a pressure side from a leading edge of the blade body portion, at least in a part of an extension range of the anti-erosion layer in the blade spanwise direction.

With the above configuration (1), the center point of the anti-erosion layer in the circumferential length direction along the blade profile is offset toward the pressure side from the leading edge, and thereby the anti-erosion layer can appropriately protect the "portion on the pressure surface sensitive to the influence from erosion", where the inflow angle of a foreign substance (e.g. raindrops, dusts) that flows with wind into the wind turbine blade is approximately 90 degrees.

(2) In some embodiments, in the above configuration (1), a shift amount $\Delta x$, from the leading edge toward the pressure side, of the center point in the circumferential length direction along the blade profile of the anti-erosion layer is greater at a first position in the blade spanwise direction than at a second position which is closer to a blade tip than the first position in the blade spanwise direction.

According to the qualitative trend, it is necessary to increase the shift amount of the center point of the anti-erosion layer from the leading edge at the first position, which is closer to the blade root, compared with at the second position, which is closer to the blade tip.

With the above configuration (2), the shift amount $\Delta x$ of the center point of the anti-erosion layer from the leading edge is set to be greater at the first position closer to the blade root than at the second position, and thereby it is possible to suppress erosion appropriately at the first position where the inflow angle of wind with respect to the wind turbine blade is relatively large.

(3) In some embodiments, in the above configuration (1) or (2), a circumferential length of the anti-erosion layer along the blade profile is greater at a first position in the blade spanwise direction than at a second position which is closer to a blade tip than the first position in the blade spanwise direction.

The tip speed is lower at the first position closer to the blade root than at the second position closer to the blade tip, and thus the inflow angle of the foreign substance changes more at the first position in accordance with a change in the wind speed. Accordingly, it is more advantageous to increase the circumferential length of the anti-erosion layer along the blade profile at the side of the blade root portion.

In this regard, with the above configuration (3), the anti-erosion layer is formed to be wider in a direction along the blade profile at the first position closer to the blade root than at the second position closer to the blade tip in the blade spanwise direction, and thereby it is possible to suppress erosion appropriately.

(4) In some embodiments, in any one of the above configurations (1) to (3), an average $\Delta x_{AVE}$ of a shift amount, from the leading edge toward the pressure side, of the center point of the anti-erosion layer in the circumferential length direction along the blade profile satisfies an expression $\Delta x_{AVE}/R \geq 2.0 \times 10^{-4}$, in a range of a rotational radius position r of the wind turbine blade of at least 0.7R and not more than 1.0R (where R is a rotational radius position of a blade tip of the wind turbine blade).

With the above configuration (4), in the outer 30% range of the rotational radius from the blade tip, the center point of the anti-erosion layer in the circumferential length direction along the blade profile is offset toward the pressure side by the shift amount $\Delta x$ satisfying $\Delta x_{AVE}/R \geq 2.0 \times 10^{-4}$ at the average $\Delta x_{AVE}$, and thereby the anti-erosion layer can appropriately protect the portion on the pressure surface where the inflow angle of the foreign substance that flows with wind into the wind turbine blade is approximately 90 degrees.

(5) In some embodiments, in any one of the above configurations (1) to (4), an average $\Delta x_{AVE}$ of a shift amount $\Delta x$, from the leading edge toward the pressure side, of the center point of the anti-erosion layer in the circumferential length direction along the blade profile satisfies an expression $\Delta x_{AVE}/R \geq 3.0 \times 10^{-4}$, in a range of a rotational radius position r of the wind turbine blade of at least 0.55R and not more than 1.0R (where R is a rotational radius position of a blade tip of the wind turbine blade).

With the above configuration (5), in the outer 45% range of the rotational radius from the blade tip, the center point of the anti-erosion layer in the circumferential length direction along the blade profile is offset toward the pressure side by the shift amount $\Delta x$ satisfying $\Delta x_{AVE}/R \geq 3.0 \times 10^{-4}$ at the average $\Delta x_{AVE}$, and thereby the anti-erosion layer can appropriately protect the portion on the pressure surface where the inflow angle of the foreign substance that flows with wind into the wind turbine blade is approximately 90 degrees.

(6) In some embodiments, in any one of the above configurations (1) to (5), an average $\Delta x_{AVE}$ of a shift amount, from the leading edge toward the pressure side, of the center point of the anti-erosion layer in the circumferential length direction along the blade profile satisfies an expression $\Delta x_{AVE}/R \geq 4.5 \times 10^{-4}$, in a range of a rotational radius position r of the wind turbine blade of at least 0.25R and not more than 1.0R (where R is a rotational radius position of a blade tip of the wind turbine blade).

With the above configuration (6), in the outer 75% range of the rotational radius from the blade tip, the center point of the anti-erosion layer in the circumferential length direction along the blade profile is offset toward the pressure side by the shift amount $\Delta x$ satisfying $\Delta x_{AVE}/R \geq 4.5 \times 10^{-4}$ at the average $\Delta x_{AVE}$, and thereby the anti-erosion layer can appropriately protect the portion on the pressure surface where the inflow angle of the foreign substance that flows with wind into the wind turbine blade is approximately 90 degrees.

(7) In some embodiments, in any one of the above configurations (1) to (6), the anti-erosion layer extends from a first end portion to a second end portion which is on the pressure side, in the cross section orthogonal to the blade spanwise direction. A circumferential length $w_{2tip}$ of a portion of the anti-erosion layer along the blade profile, the portion extending from the leading edge to the second end portion, satisfies an expression $w_{2tip}/R \geq 6.0 \times 10^{-4}$ (where R is a rotational radius position of a blade tip of the wind turbine blade) in a vicinity of a blade tip of the wind turbine blade.

With the above configuration (7), the circumferential length $w_{2tip}$ of a portion, from the leading edge to the second end portion, of the anti-erosion layer along the blade profile in the vicinity of the blade tip of the wind turbine blade satisfies an expression $w_{2tip}/R \geq 6.0 \times 10^{-4}$, and thereby the anti-erosion layer can appropriately protect the portion on the pressure surface where the inflow angle of the foreign substance that flows with wind into the wind turbine blade is approximately 90 degrees.

(8) in some embodiments, in any one of the above configurations (1) to (7), the anti-erosion layer extends from a first end portion to a second end portion which is on the pressure side, in the cross section orthogonal to the blade spanwise direction. An average $w_{2AVE}$ of a circumferential length of a portion of the anti-erosion layer along the blade profile, the portion extending from the leading edge to the second end portion, satisfies an expression $w_{2AVE}/R \geq 1.5 \times 10^{-3}$, in a range of a rotational radius position r of the wind turbine blade of at least 0.55R and not more than 0.6R (where R is a rotational radius position of a blade tip of the wind turbine blade).

With the above configuration (8), the average $w_{2AVE}$ of the circumferential length along the blade profile of a portion, from the leading edge to the second end portion, of the anti-erosion layer at the substantially center portion in the longitudinal direction of the wind turbine blade satisfies an expression $w_{2AVE}/R \geq 5 \times 10^{-3}$, and thereby the anti-erosion layer can appropriately protect the portion on the pressure surface where the inflow angle of the foreign substance that flows with wind into the wind turbine blade is approximately 90 degrees.

(9) In some embodiments, in any one of the above configurations (1) to (8), the anti-erosion layer extends from a first end portion to a second end portion which is on the pressure side, in the cross section orthogonal to the blade spanwise direction. An average $w_{2AVE}$ of a circumferential length of a portion of the anti-erosion layer along the blade profile, the portion extending from the leading edge to the second end portion, satisfies an expression $w_{2AVE}/R \geq 2.1 \times 10^{-3}$, in a range of a rotational radius position r of the wind turbine blade of at least 0.2R and not more than 0.3R (where R is a rotational radius position of a blade tip of the wind turbine blade).

With the above configuration (9), the average $w_{2AVE}$ of the circumferential length of a portion, from the leading edge to the second end portion, of the anti-erosion layer along the blade profile in the vicinity of the blade root portion in the longitudinal direction of the wind turbine blade satisfies an expression $w_{2AVE}/R \geq 2.1 \times 10^{-3}$, and thereby the anti-erosion layer can appropriately protect the portion on the pressure surface where the inflow angle of the foreign substance that flows with wind into the wind turbine blade is approximately 90 degrees, in the vicinity of the blade root portion of the wind turbine blade. The first end portion of the anti-erosion layer may be disposed closer to the suction side than the leading edge, or closer to the pressure side than the leading edge.

(10) In some embodiments, in any one of the above configurations (1) to (9), the anti-erosion layer extends from a first end portion on a suction side to a second end portion on the pressure side, in the cross section orthogonal to the blade spanwise direction. An average $w_{1AVE}$ of a circumferential length of a portion of the anti-erosion layer along the blade profile, the portion extending from the leading edge to the first end portion, satisfies an expression $w_{1AVE}/R \geq 4.0 \times 10^{-4}$, in a range of a rotational radius position r of the wind turbine blade of at least 0.7R and not more than 1.0R (where R is a rotational radius position of a blade tip of the wind turbine blade).

With the above configuration (10), in the outer 30% range of the rotational radius from the blade tip, the first end portion on the suction surface of the anti-erosion layer has the circumferential length along the blade profile from the leading edge satisfying $w_{1AVE}/R \geq 4.0 \times 10^{-4}$ at the average $w_{1AVE}$, and thereby the anti-erosion layer can appropriately prevent erosion of the blade body portion due to collision with the foreign substance that flows with wind, also on the suction side.

(11) In some embodiments, in any one of the above configurations (1) to (10), the anti-erosion layer extends from a first end portion on a suction side to a second end portion on the pressure side, in the cross section orthogonal to the blade spanwise direction. An average $w_{1AVE}$ of a circumferential length of a portion of the anti-erosion layer along the blade profile, the portion extending from the leading edge to the first end portion, satisfies an expression $w_{1AVE}/R \geq 2.0 \times 10^{-4}$, in a range of a rotational radius position r of the wind turbine blade of at least 0.55R and not more than 1.0R (where R is a rotational radius position of a blade tip of the wind turbine blade).

With the above configuration (11), in the outer 45% range of the rotational radius from the blade tip, the first end portion on the suction side of the anti-erosion layer has a circumferential length along the blade profile from the leading edge that satisfies $w_{1AVE}/R \geq 2.0 \times 10^{-4}$ at the average $w_{1AVE}$, and thereby the anti-erosion layer can appropriately prevent erosion of the blade body portion due to collision with the foreign substance that flows with wind, also on the suction side.

(12) In some embodiments, in any one of the above configurations (1) to (11), the anti-erosion layer extends from a first end portion on a suction side to a second end portion on the pressure side, in the cross section orthogonal to the blade spanwise direction. An average $w_{1AVE}$ of a circumferential length of a portion of the anti-erosion layer along the blade profile, the portion extending from the leading edge to the first end portion, satisfies an expression $w_{1AVE}/R \geq 9.0 \times 10^{-4}$, in a range of a rotational radius position r of the wind turbine blade of at least 0.55R and not more than 1.0R (where R is a rotational radius position of a blade tip of the wind turbine blade).

With the above configuration (12), in the outer 45% range of the rotational radius from the blade tip, the first end portion on the suction side of the anti-erosion layer has a circumferential length along the blade profile from the leading edge that satisfies $w_{1AVE}/R \geq 9.0 \times 10^{-4}$ at the average $w_{1AVE}$, and thereby the anti-erosion layer can appropriately prevent erosion of the blade body portion due to collision with the foreign substance that flows with wind, also on the suction side.

(13) in some embodiments, in any one of the above configurations (1) to (12), the anti-erosion layer extends from a first end portion on a suction side to a second end portion on the pressure side, in the cross section orthogonal to the blade spanwise direction. An average $w_{1AVE}$ of a circumferential length of a portion of the anti-erosion layer along the blade profile, the portion extending from the leading edge to the first end portion, satisfies an expression $w_{1AVE}/R \geq 1.0 \times 10^{-3}$, at any position in the blade spanwise direction.

With the above configuration (13), at any position in the blade spanwise direction, the first end portion on the suction side of the anti-erosion layer has a circumferential length along the blade profile from the leading edge that satisfies $w_{1AVE}/R \geq 1.0 \times 10^{-3}$ at the average $w_{1AVE}$, and thereby the anti-erosion layer can appropriately prevent erosion of the blade body portion due to collision with the foreign substance that flows with wind, also on the suction side.

(14) A wind turbine rotor according to at least some embodiments of the present invention comprises: the wind turbine blade according to in any of the above configurations (1) to (13); and a hub to which a blade root of the wind turbine blade is connected.

With the above configuration (14), as mentioned in the above (1), the center point of the anti-erosion layer in the circumferential length direction along the blade profile is offset toward the pressure side from the leading edge, and thereby it is possible to provide a wind turbine rotor including a wind turbine blade whereby the anti-erosion layer can appropriately protect the "portion on the pressure surface sensitive to the influence from erosion", where the inflow angle of the foreign substance (e.g. raindrops, dusts) that flows with wind into the wind turbine blade is approximately 90 degrees.

(15) A wind turbine power generating apparatus according to at least some embodiments of the present invention comprises: the wind turbine rotor according to the above configuration (14); and a generator for generating electric power from rotational energy of the wind turbine rotor.

With the above configuration (15), as mentioned in the above (1), the center point of the anti-erosion layer in the circumferential length direction along the blade profile is offset toward the pressure side from the leading edge, and thereby it is possible to provide a wind turbine power generating apparatus including a wind turbine blade whereby the anti-erosion layer can appropriately protect the "portion on the pressure surface sensitive to the influence from erosion", where the inflow angle of the foreign substance (e.g. raindrops, dusts) that flows with wind into the wind turbine blade is approximately 90 degrees.

Advantageous Effects

According to at least one embodiment of the present invention, it is possible to protect a wind turbine blade from erosion appropriately.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
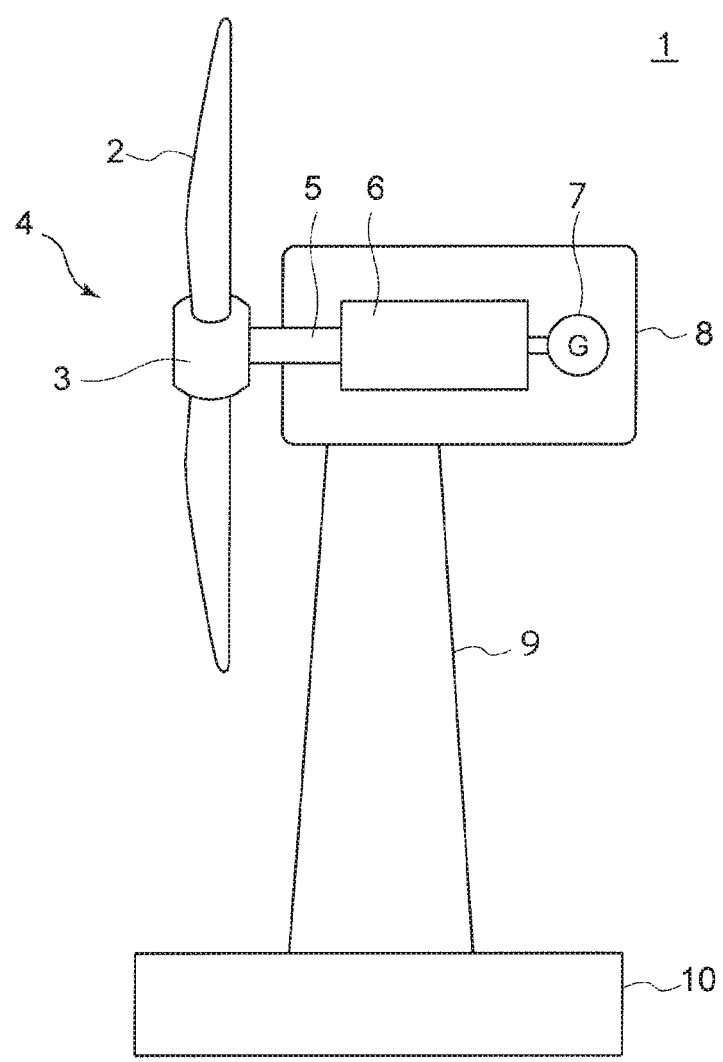
FIG. 1 is a schematic diagram of a configuration example of a wind turbine power generation facility according to an embodiment.
Figure 2:
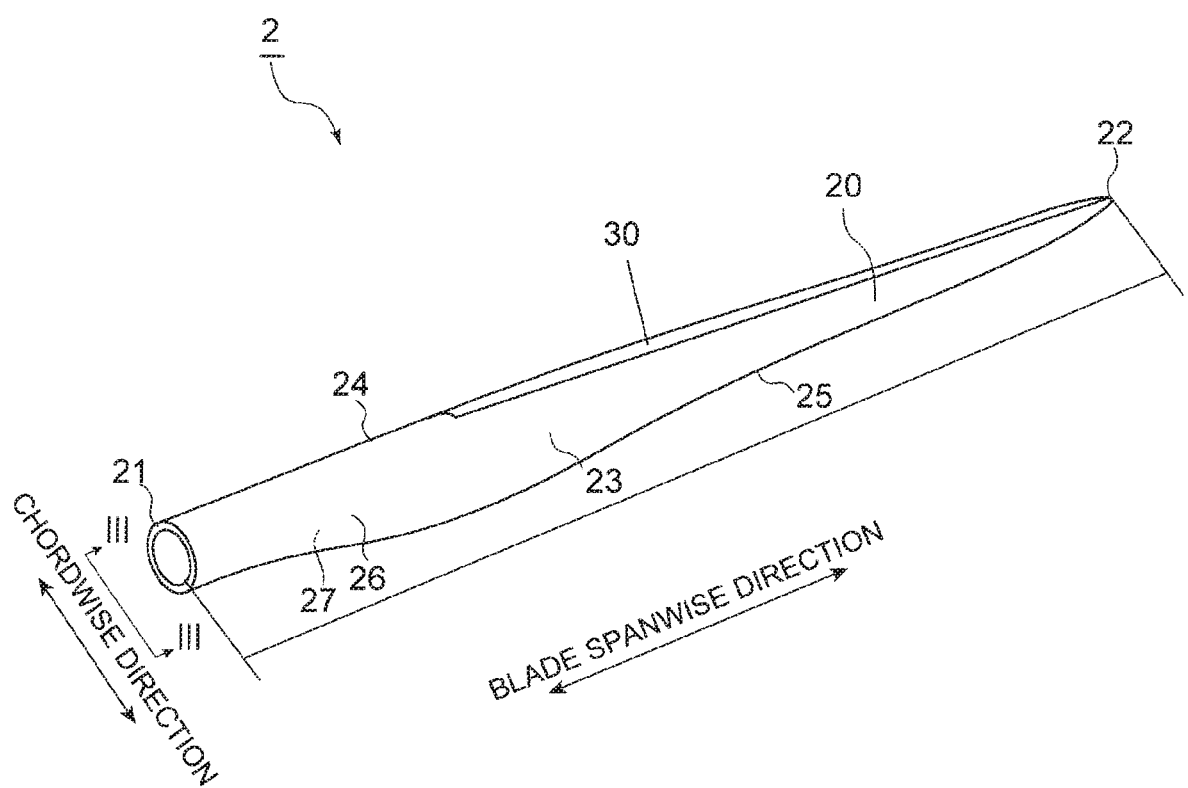
FIG. 2 is a perspective view of a wind turbine blade according to an embodiment.

FIG. 1 is a schematic diagram of a configuration example of a wind turbine power generating apparatus according to an embodiment. FIG. 2 is a perspective view of a wind turbine blade according to an embodiment.

As depicted in FIG. 1, a wind turbine power generating apparatus (hereinafter, referred to as a wind turbine) 1 according to at least one embodiment of the present invention includes a wind turbine rotor (hereinafter, referred to as a rotor) 4 that rotates in response to wind energy, and a generator 7 for generating electric power from rotational energy of the rotor 4. The rotor 4 includes at least one (e.g. three) wind turbine blades 2 and a hub 3 to which blade root portions 21 of the wind turbine blades 2 are connected.

In some embodiments, the wind turbine 1 further includes a main shaft 5 provided so as to be rotatable integrally with the hub 3, a nacelle 8 supporting the rotor 4 rotatably substantially about the horizontal axis via the main shaft 5 and a non-depicted main bearing, a drivetrain 6 for transmitting rotation of the main shaft 5 to the generator 7, a tower 9 supporting the nacelle 8 rotatably in the horizontal direction, and a base 10 on which the tower 9 is erected.

Next, with reference to FIG. 2, the wind turbine blade 2 according to some embodiments will be described.

As depicted in FIG. 2, the wind turbine blade 2 according to an embodiment includes a blade body portion 20 extending from a blade root portion 21 toward a blade tip portion 22, and an anti-erosion layer 30 disposed so as to cover the surface of the blade body portion 20 partially. Next, the blade body portion 20 will be described, and then the anti-erosion layer 30 in detail.

As depicted in FIG. 2, the blade body portion 20 includes the blade root portion 21 to be attached to the hub 3 of the wind turbine 1, the blade tip portion 22 positioned farthest from the hub 3, and an airfoil portion 23 extending between the blade root portion 21 and the blade tip portion 22 in the blade spanwise direction. Further, the blade body portion 20 has a leading edge 24 and a trailing edge 25 extending from the blade root portion 21 to the blade tip portion 22. The contour of the blade body portion 20 is defined by a suction surface 26 (suction side) and a pressure surface 27 (pressure side) defined across the leading edge 24 and the trailing edge 25 (see FIGS. 2, 3A, and 3B).

In the present specification, "blade spanwise direction" refers to a direction connecting the blade root portion 21 and the blade tip portion 22, and "chordwise direction (blade chordwise direction)" refers to a direction along a line (chord) connecting the leading edge 24 and the trailing edge 25 of the blade body portion 20. Further, a flap direction refers to a direction substantially orthogonal to the chordwise direction connecting the leading edge 24 and the trailing edge 25, that is, a direction connecting the suction side and the pressure side of the blade body portion 20. (see FIGS. 2, 3A, and 3B). Furthermore. "blade root portion" refers to a cylindrical portion of the wind turbine blade 2, which has a substantially circular cross section, extending in the blade spanwise directional range of 5 m, for instance, from the end surface on the blade root side of the blade body portion 20 of the wind turbine blade (typically, the range of 1 m to 3 m from the end surface).

Figure 3A:
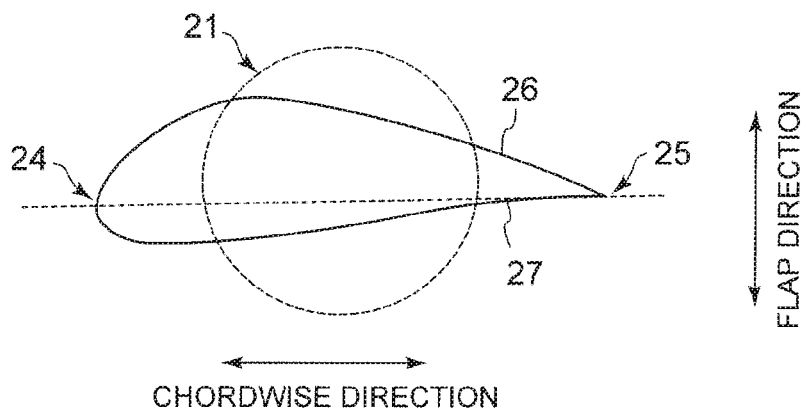
FIG. 3A is a schematic diagram as seen in the direction of arrows III-III in FIG. 2, for explaining the shape of the wind turbine blade (the first position).
Figure 3B:
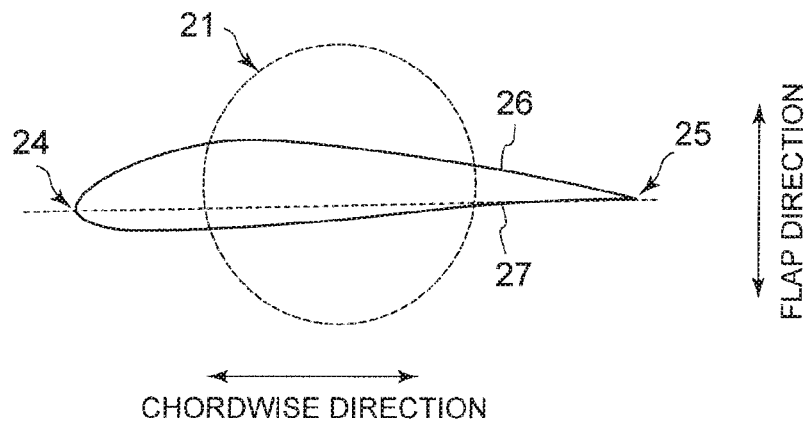
FIG. 3B is a schematic diagram as seen in the direction of arrows III-III FIG. 2, for explaining the shape of the wind turbine blade (the second position).

In some embodiments, the blade body portion 20 may be configured such that the suction surface 26 and the pressure surface 27 are joined to each other to form a single piece along the edge portion of each of the leading edge 24 and the trailing edge 25, as depicted in FIGS. 2, 3A, and 3B. In some embodiments, two half sections of the wind turbine blade 2, each including a corresponding one of the suction surface 26 or the pressure surface 27, may be coupled to each other via at least one shear web (not depicted) in the blade spanwise direction at respective inner surface sides facing each other.

Next, with reference to FIGS. 3A and 3B, the airfoil shape of the wind turbine blade 2 will be described.

FIG. 3A is a schematic diagram as seen in the direction of arrows III-III in FIG. 2, for explaining the shape of the wind turbine blade 2 at the first position (described below). FIG. 3B is a schematic diagram as seen in the direction of arrows III-III in FIG. 2, for explaining the shape of the wind turbine blade 2 at the second position (described below).

As depicted in FIGS. 3A and 3B, in some embodiments, the blade body portion 20 is formed so that the airfoil portion 23 has such a shape that a camber is larger and thicker at the side of the blade root portion 21 and is smaller and thinner at the side of the blade tip portion 22, in general. In other words, the blade body portion 20 may have different airfoil shapes at different positions in the blade spanwise direction. For instance, the airfoil shape at a position (the first position) other than the blade tip in the blade spanwise direction may have a larger and thicker camber than the airfoil shape at a position (the second position) closer to the blade tip portion 22 than the first position.

Subsequently, with reference to FIGS. 4A to 4D, the collision angle (=inflow angle φ) between the blade body portion 20 and a foreign substance Rd in the air (e.g. raindrops, dusts) at different two positions (the first position and the second position) in the longitudinal direction of the blade body portion 20 will be described.

Figure 4A:
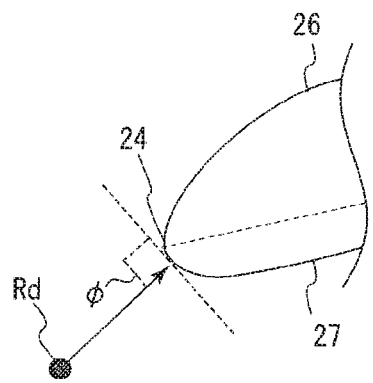
FIG. 4A is an explanatory diagram showing an aspect of collision between a wind turbine blade and a raindrop.
Figure 4B:
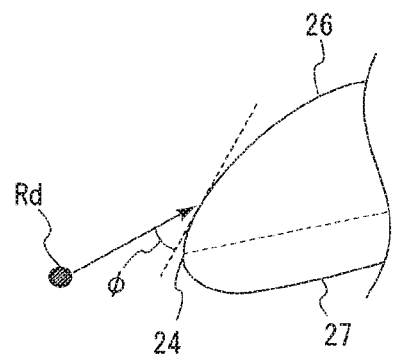
FIG. 4B is an explanatory diagram showing an aspect of collision between a wind turbine blade and a raindrop.
Figure 4C:
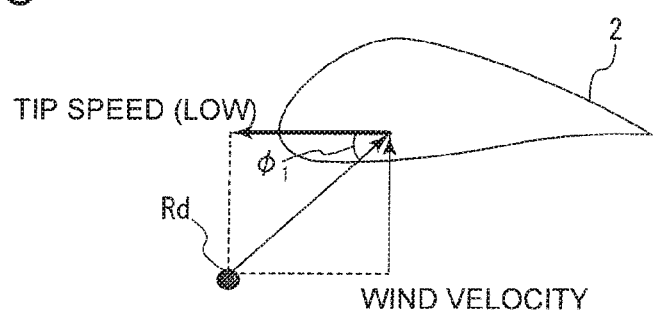
FIG. 4C is an explanatory diagram showing an aspect of collision between a wind turbine blade and a raindrop (first position).
Figure 4D:
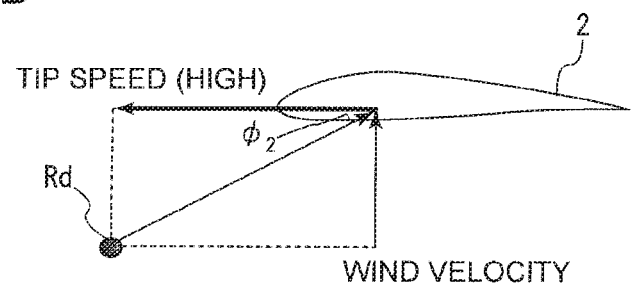
FIG. 4D is an explanatory diagram showing an aspect of collision between a wind turbine blade and a raindrop (second position).

First, damage to the blade body portion 20 upon collision with the foreign substance Rd is greatest when the foreign substance Rd hits the blade surface perpendicularly (at an angle of 90 degrees) (see FIG. 4A), and the damage to the blade body portion 20 is smaller when the inflow angle φ is shallow and smaller than 90 degrees (see FIG. 4B).

While the wind turbine blade 2 is rotating, the tip speed is higher at the second position (see FIG. 4D) on the side of the blade tip portion 22 where the rotational radius is greater, than at the first position (see FIG. 4C) which is closer to the blade root portion 21 than the second position. Thus, when the foreign substance Rd in the air approaches the rotor 4 at the same wind speed and collides with the wind turbine blade 2, the inflow angle $\varphi_1$ of the foreign substance Rd with the blade surface (the pressure surface 27) at the first position with a lower tip speed is greater than the inflow angle $\varphi_2$ of the foreign substance Rd with the blade surface (the pressure surface 27) at the second position ($\varphi_1 > \varphi_2$). Further, as described above, at the first position disposed relatively close to the blade root portion 21, the airfoil shape has a greater camber than at the second position closer to the blade tip portion 22 than the first position, and thus both the suction surface 26 and the pressure surface 27 have a curved surface with a greater curvature at the first position than at the second position, in the vicinity of the leading edge 24 (see FIGS. 4C and 4D).

Figure 5A:
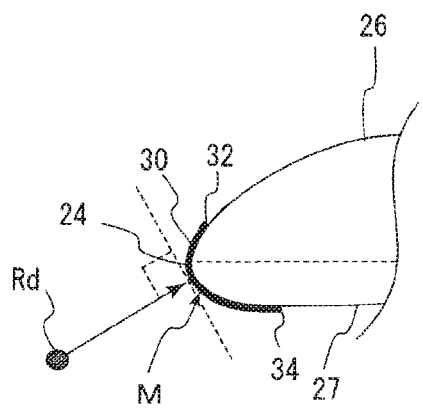
FIG. 5A is a schematic diagram of an anti-erosion layer at the first position according to an embodiment.
Figure 5B:
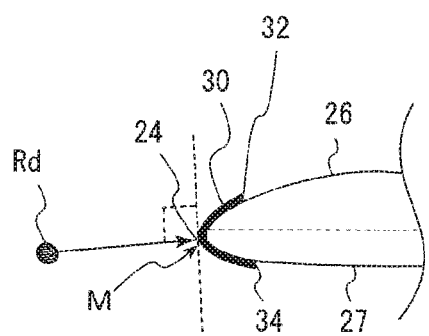
FIG. 5B is a schematic diagram of an anti-erosion layer at the second position according to an embodiment.

Accordingly, at the second position closer to the blade tip portion 22, the inflow angle φ between the blade body portion 20 and the foreign substance Rd reaches 90 degrees at a position closer to the leading edge 24 (see FIG. 5B). On the other hand, at the first position closer to the blade root portion 21, the inflow angle φ of the foreign substance Rd with respect to the blade surface reaches 90 degrees at a position offset toward the pressure surface 27 with reference to the leading edge 24 (see FIG. 5A). In view of the relationship between the first position and the second position in the blade spanwise direction, the closer to the blade root portion 21, the more the position where the inflow angle φ between the foreign substance Rd and the blade body portion 20 reaches 90 degrees is offset toward the pressure surface 27 from the leading edge 24.

Next, the anti-erosion layer 30 according to some embodiments will be described.

In some embodiments, the anti-erosion layer 30 is a protection material having a wear-resistant (erosion-resistant) property, and may be embodied as a tape, paint, coating, or the like. The anti-erosion layer 30 is applied or attached to the surface of the blade body portion 20 to protect the blade body portion 20 from collision with the foreign substance Rd in the air. In some embodiments, the anti-erosion layer 30 may be a polyurethane coating material (e.g. 3M Wind Blade Protection Coating W4600 of 3M (trademark), a polyurethane coating material of BASF), or a tape with such a polyurethane coating material applied thereto.

Figure 6:
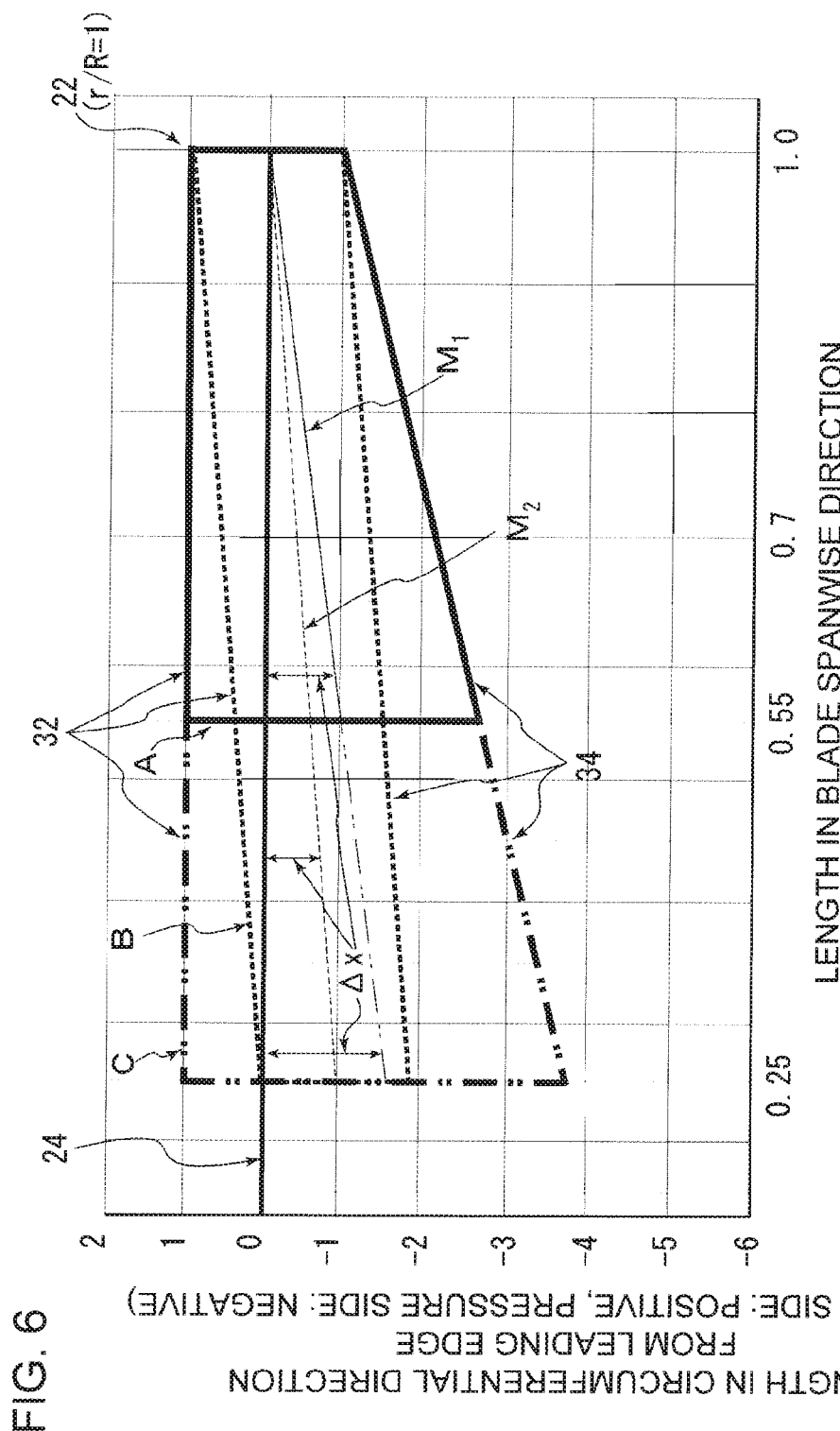
FIG. 6 is a schematic diagram showing an application range of an anti-erosion layer according to an embodiment.

FIG. 6 is a schematic diagram showing an application range of the anti-erosion layer 30 in some embodiments. In FIG. 6, the x-axis represents a distance from the center of the hub 3 (hub center) in the longitudinal direction of the wind turbine blade 2 (blade spanwise direction), where the rotational radius r at the application position of the anti-erosion layer 30 is divided by the rotational radius R (distance from the hub center) at the blade tip portion 22, to obtain a dimensionless quantity (r/R), showing the hub center as zero and the blade tip portion 22 as 1.0. Further, the y-axis represents the application range of the anti-erosion layer 30 in the circumferential direction of the wind turbine blade 2, which is the circumferential length of the anti-erosion layer 30 along the blade profile, showing a relative circumferential length from the leading edge 24 being the standard (zero), where the side of the suction surface 26 is positive, and the side of the pressure surface 27 is negative.

As depicted in FIG. 6, in some embodiments, the anti-erosion layer 30 may have a center point M (e.g. $M_1$, $M_2$) in the circumferential length direction along the blade profile in a cross section orthogonal to the blade spanwise direction, shifted toward the pressure surface 27 from the leading edge 24 of the blade body portion 20, at least in a part of the extension range of the anti-erosion layer 30 in the blade spanwise direction.

Specifically, for instance, like the application pattern A of the anti-erosion layer 30 shown by the solid line (thick line) in FIG. 6, the center point $M_1$ of the anti-erosion layer 30 in the circumferential length direction along the blade profile in a cross section orthogonal to the blade spanwise direction may be offset toward the pressure surface 27 (i.e. toward the negative region) from the leading edge 24 (see FIG. 5A). Further, for instance, like the application pattern B of the anti-erosion layer 30 shown by the dotted line (thick line) in FIG. 6, the center point $M_2$ of the anti-erosion layer 30 in the circumferential length direction along the blade profile in a cross section orthogonal to the blade spanwise direction may be offset toward the pressure surface 27 (i.e. toward the negative region) from the leading edge 24.

With the application pattern A and the application pattern C of the anti-erosion layer 30, the application range of the anti-erosion layer 30 has a certain circumferential length from the leading edge 24 toward the suction surface 26 (i.e. the positive region). In contrast, with the application pattern B, the anti-erosion layer 30 is applied to a certain range on both of the front and rear sides along the circumferential direction (blade profile) of the wind turbine blade 2, centered at "a portion on the pressure surface 27 sensitive to the influence of erosion" (M2) where the inflow angle of the foreign substance Rd that flows into the wind turbine blade 2 with wind is approximately 90 degrees. In the application pattern B, the anti-erosion layer 30 is not applied to an unnecessary range. Furthermore, for instance, as depicted by the two-dotted line in FIG. 6, the application pattern A of the anti-erosion layer 30 may be extended from the side of the blade tip portion 22 to the side of the blade root portion 21 like the application pattern C.

With the above configuration, the center point M of the anti-erosion layer 30 in the circumferential length direction along the blade profile is offset toward the pressure surface 27 from the leading edge 24, and thereby the anti-erosion layer 30 can appropriately protect the "portion on the pressure surface 27 sensitive to the influence from erosion", where the inflow angle of the foreign substance Rd that flows with wind into the wind turbine blade 2 is approximately 90 degrees.

In some embodiments, the anti-erosion layer 30 may be formed so that a shift amount Δx of the center point M, from the leading edge 24 toward the pressure surface 27, in the circumferential length direction along the blade profile is greater at the first position in the blade spanwise direction than at the second position, the second position being closer to the blade tip portion 22 than the first position in the blade spanwise direction.

Specifically, as depicted in FIG. 6, in all of the application patterns A, B, and C, the anti-erosion layer 30 is formed so that the shin amount Δx of the center point M ($M_1$, $M_2$) of the anti-erosion layer 30 from the leading edge 24 in the circumferential length direction along the blade profile is greater at the first position, which is closer to the blade root portion 21 (the left side in FIG. 6), than at the second position, which is closer to the blade tip portion 22 (the right side in FIG. 6) than the first position in the blade spanwise direction.

With the above configuration, the shift amount Δx of the center point M of the anti-erosion layer 30 from the leading edge 24 is set to be greater at the first position closer to the blade root portion 21 than the second position, and thereby it is possible to suppress erosion appropriately at the first position where the inflow angle of wind with respect to the wind turbine blade 2 is relatively large.

In some embodiments, the anti-erosion layer 30 may be formed so as to have a circumferential length along the blade profile that is greater at the first position in the blade spanwise direction than at the second position closer to the blade tip portion 22 than the first position in the blade spanwise direction. In other words, like the application pattern A shown in FIG. 6, the circumferential length of the anti-erosion layer 30 along the blade profile may be greater at the first position on the left side in FIG. 6 than at the second position on the right side in FIG. 6.

As mentioned above, the tip speed is lower at the first position on the side of the blade root portion 21 than at the second position on the side of the blade tip portion 22. Thus, the change in the inflow angle φ of the foreign substance Rd accompanying the change in the wind speed may be greater at the first position than at the second position. Accordingly, it is more advantageous to have a longer circumferential length along the blade profile of the anti-erosion layer 30 at the side closer to the blade root portion 21.

In this regard, with the above configuration, the anti-erosion layer 30 is formed to be wider in a direction along the blade profile at the first position on the side of the blade root portion 21 than at the second position on the side of the blade tip portion in the blade spanwise direction, and thereby it is possible to suppress erosion appropriately.

In some embodiments, the anti-erosion layer 30 may be configured such that an average $\Delta x_{AVE}$ of the shift amount Δx of the center point M of the anti-erosion layer 30, from the leading edge 24 toward the pressure surface 27, in the circumferential length direction along the blade profile satisfies the following expression (1), in the range of the rotational radius position r of the wind turbine blade 2 of at least 0.7R and not more than 1.0R, where R is the rotational radius of the blade tip portion 22 of the wind turbine blade 2 (i.e., the length from the hub center to the blade tip portion 22 is R; the same shall apply hereinafter).

(Expression 1)

$$\Delta x_{AVE}/R \geq 2.0 \times 10^{-4} \qquad (1)$$

As depicted in FIG. 6, in a case where R of a wind turbine is 70 to 90 m, if the wind turbine blade 2 has R=80 m, the average $\Delta x_{AVE}$ of the shift amount Δx of the center point M of the anti-erosion layer 30, from the leading edge 24 toward the pressure surface 27, in the circumferential length direction of the blade profile may satisfy an expression $\Delta x_{AVE} \geq 2.0 \times 10^{-4} \times 80 \times 1000 = 16$ mm, in the range of the rotational radius position r satisfying $0.7 \leq R \leq 1.0$ (i.e., 56 m≤r≤80 m from the hub center).

Herein, in the vicinity of the blade tip portion 22, the anti-erosion layer 30 may be configured such that the center point M of the anti-erosion layer 30 in the circumferential length direction along the blade profile at the blade tip portion 22 is positioned on the leading edge 24, thus satisfying Δx=0 at the blade tip portion 22 or in the vicinity thereof. Also, in this case, it is preferable that the average $\Delta x_{AVE}$ of the shift amount Δx of the center point of the anti-erosion layer 30, from the leading edge 24 toward the pressure surface 27, in the circumferential length direction along the blade profile satisfies the above expression (1) in the above range of the rotational radius position r.

With the above configuration, in the outer 30% range of the rotational radius from the blade tip portion 22, the center point M of the anti-erosion layer 30 in the circumferential length direction along the blade profile is offset toward the pressure surface 27 by the shift amount Δx satisfying $\Delta x_{AVE}/R \geq 2.0 \times 10^{-4}$ at the average $\Delta x_{AVE}$, and thereby the anti-erosion layer 30 can appropriately protect the portion on the pressure surface 27 where the inflow angle of the foreign substance Rd that flows with wind into the wind turbine blade 2 is approximately 90 degrees.

In some embodiments, the anti-erosion layer 30 may be configured such that the average $\Delta x_{AVE}$ of the shift amount Δx of the center point M of the anti-erosion layer 30, from the leading edge 24 toward the pressure surface 27, in the circumferential length direction along the blade profile satisfies the following expression (2), in the range of the rotational radius position r of the wind turbine blade 2 of at least 0.55R and not more than 1.0R.

(Expression 2)

$$\Delta x_{AVE}/R \geq 3.0 \times 10^{-4} \qquad (2)$$

As depicted in FIG. 6, if the wind turbine blade 2 has R=80 m, the average $\Delta x_{AVE}$ of the shift amount Δx of the center point M of the anti-erosion layer 30, from the leading edge 24 toward the pressure surface 27, in the circumferential length direction of the blade profile may satisfy an expression $\Delta x_{AVE} \geq 3.0 \times 10^{-4} \times 80 \times 1000 = 24$ mm, in the range of the rotational radius position r satisfying $0.55 \leq R \leq 1.0$ (i.e., 44 m≤r≤80 m from the hub center).

With the above configuration, in the outer 45% range of the rotational radius from the blade tip portion 22, the center point M of the anti-erosion layer 30 in the circumferential length direction along the blade profile is offset toward the pressure surface 27 by the shift amount Δx satisfying $\Delta x_{AVE}/R \geq 3.0 \times 10^{-4}$ at the average $\Delta x_{AVE}$, and thereby the anti-erosion layer 30 can protect the portion on the pressure surface 27 where the inflow angle of the foreign substance that flows with wind into the wind turbine blade 2 is approximately 90 degrees.

In some embodiments, the anti-erosion layer 30 may be configured such that the average $\Delta x_{AVE}$ of the shift amount Δx of the center point M of the anti-erosion layer 30, from the leading edge 24 toward the pressure surface 27, in the circumferential length direction along the blade profile satisfies the following expression (3), in the range of the rotational radius position r of the wind turbine blade 2 of at least 0.25R and not more than 1.0R.

(Expression 3)

$$\Delta x_{AVE}/R \geq 4.5 \times 10^{-4} \qquad (3)$$

As depicted in FIG. 6, if the wind turbine blade 2 has R=80 m, the average $\Delta x_{AVE}$ of the shift amount $\Delta x$ of the center point M of the anti-erosion layer 30, from the leading edge 24 toward the pressure surface 27, in the circumferential length direction along the blade profile may satisfy an expression $\Delta x_{AVE} \geq 4.5 \times 10^{-4} \times 80 \times 1000 = 36$ mm, in the range of the rotational radius position r satisfying an expression $0.25 \leq R \leq 1.0$ (i.e., 20 m≤r≤80 m from the hub center).

With the above configuration, in the outer 75% range of the rotational radius from the blade tip portion 22, the center point M of the anti-erosion layer 30 in the circumferential length direction along the blade profile is offset toward the pressure surface 27 by the average $\Delta x_{AVE}$ satisfying $\Delta x_{AVE}/R \geq 4.5 \times 10^{-4}$, and thereby the anti-erosion layer 30 can protect the portion on the pressure surface 27 where the inflow angle of the foreign substance that flows with wind into the wind turbine blade 2 is approximately 90 degrees.

In some embodiments, the anti-erosion layer 30 may extend from the first end portion 32 to the second end portion 34 which is on the pressure surface 27 in a cross section orthogonal to the blade spanwise direction, and may be configured such that the circumferential length $w_{2tip}$ along the blade profile of a portion, from the leading edge 24 to the second end portion 34, of the anti-erosion layer 30 satisfies the following expression (4) in the vicinity of the blade tip portion 22 of the wind turbine blade 2.

(Expression 4)

$$w_{2tip}/R \geq 6.0 \times 10^{-4} \qquad (4)$$

Herein, "vicinity of the blade tip portion 22 (blade tip vicinity)" refers to a range of r that satisfies an expression $0.95 \leq r/R \leq 1.0$.

As depicted in FIG. 6, if the wind turbine blade 2 has R=80 m, the circumferential length $w_{2tip}$ along the blade profile of a portion, from the leading edge 24 to the second end portion 34, of the anti-erosion layer 30 may satisfy an expression $w_{2tip} \geq 6.0 \times 10^{-4} \times 80 \times 1000 = 48$ mm, in the range of the rotational radius position r satisfying an expression $0.95 \leq R \leq 1.0$ (i.e., 76 m≤r≤80 m from the hub center).

In the above configuration, the first end portion 32 is disposed on the suction surface 26, for instance, and the anti-erosion layer 30 may be disposed so as to extend from the first end portion 32 on the suction surface 26 to the second end portion 34 on the pressure surface 27. In another embodiment, the anti-erosion layer 30 may be disposed only on the side of the pressure surface 27 in the vicinity of the blade tip portion 22. In other words, both of the first end portion 32 and the second end portion 34 may be disposed on the pressure surface 27.

With the above configuration, the circumferential length $w_{2tip}$ of a portion, from the leading edge 24 to the second end portion 34, of the anti-erosion layer 30 along the blade profile in the vicinity of the blade tip portion 22 of the wind turbine blade 2 satisfies an expression $w_{2tip}/R \geq 6.0 \times 10^{-4}$, and thereby the anti-erosion layer 30 can protect the portion on the pressure surface 27 where the inflow angle of the foreign substance Rd that flows with wind into the wind turbine blade 2 is approximately 90 degrees.

In some embodiments, the anti-erosion layer 30 extends from the first end portion 32 to the second end portion 34 on the pressure surface 27 in a cross section orthogonal to the blade spanwise direction, and may be configured such that $w_{2AVE}$ satisfies the following expression (5), where $w_{2AVE}$ is the average of the circumferential length $w_2$ (see FIGS. 7A and 7B) of a portion, from the leading edge 24 to the second end portion 34, of the anti-erosion layer 30 along the blade profile in the range of the rotational radius position r of the wind turbine blade 2 of at least 0.55 R and not more than 0.6R.

(Expression 5)

$$w_{2AVE}/R \geq 1.5 \times 10^{-3} \qquad (5)$$

As depicted in FIG. 6, if the wind turbine blade 2 has R=80 m, the average $w_{2AVE}$ of the circumferential length $w_2$ of a portion, from the leading edge 24 to the second end portion 34, of the anti-erosion layer 30 along the blade profile may satisfy an expression $w_{2AVE} \geq 1.5 \times 10^{-3} \times 80 \times 1000 = 120$ mm, in the range of the rotational radius position r satisfying an expression $0.55 \leq R \leq 0.6$ (i.e., 44 m≤r≤48 m from the hub center).

With the above configuration, the average $w_{2AVE}$ of the circumferential length $w_2$ a portion, from the leading edge 24 to the second end portion 34, of the anti-erosion layer 30 along the blade profile of at the substantially center portion in the longitudinal direction of the wind turbine blade 2 satisfies an expression $w_{2AVE}/R \geq 1.5 \times 10^{-3}$, and thereby the anti-erosion layer 30 can appropriately protect the portion on the pressure surface 27 where the inflow angle of the foreign substance Rd that flows with wind into the wind turbine blade 2 is approximately 90 degrees, at the substantially center portion in the longitudinal direction of the wind turbine blade 2.

Figure 7A:
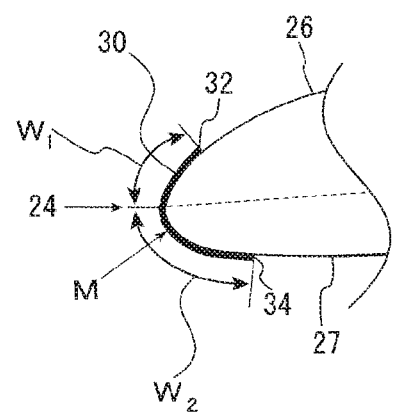
FIG. 7A is a schematic diagram of an anti-erosion layer at the first position according to an embodiment.
Figure 7B:
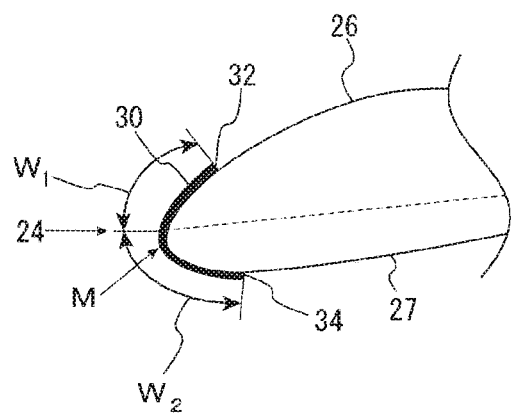
FIG. 7B is a schematic diagram of an anti-erosion layer at the second position according to an embodiment.

In some embodiments, the anti-erosion layer 30 extends from the first end portion 32 to the second end portion 34 on the pressure surface 27 in a cross section orthogonal to the blade spanwise direction, and may be configured such that $w_{2AVE}$ satisfies the following expression (6), where $w_{2AVE}$ is the average of the circumferential length $w_2$ FIGS. 7A and 7B) of a portion, from the leading edge 24 to the second end portion 34, of the anti-erosion layer 30 along the blade profile in the range of the rotational radius position r of the wind turbine blade 2 of at least 0.2R and not more than 0.3R.

(Expression 6)

$$w_{2AVE}/R \geq 2.1 \times 10^{-3} \qquad (6)$$

As depicted in FIG. 6, if the wind turbine blade 2 has R=80 m, the average $w_{2AVE}$ of the circumferential length $w_2$ of a portion, from the leading edge 24 to the second end portion 34, of the anti-erosion layer 30 along the blade profile may satisfy an expression $\Delta w_{2AVE} \geq 2.1 \times 10^{-3} \times 80 \times 1000 = 168$ mm, in the range of the rotational radius position r satisfying an expression $0.2 \leq R \leq 0.3$ (i.e., 16 m≤r≤24 m from the hub center).

With the above configuration, the average $w_{2AVE}$ of the circumferential length $w_2$ of a portion, from the leading edge 24 to the second end portion 34, of the anti-erosion layer 30 along the blade profile satisfies an expression $w_{2AVE}/R \geq 2.1 \times 10^{-3}$ in the vicinity of the blade root portion in the longitudinal direction of the wind turbine blade 2, and thereby the anti-erosion layer 30 can appropriately protect the portion on the pressure surface 27 where the inflow angle of the foreign substance Rd that flows with wind into the wind turbine blade 2 is approximately 90 degrees, in the vicinity of the blade root portion 21 of the wind turbine blade 2. The first end portion 32 of the anti-erosion layer 30 may be disposed closer to the suction surface 26 than the leading edge 24, or closer to the pressure surface 27 than the leading edge 24.

In some embodiments, the anti-erosion layer 30 extends from the first end portion 32 on the suction surface 26 to the second end portion 34 on the pressure surface 27 in a cross section orthogonal to the blade spanwise direction, and may be configured such that $w_{1AVE}$ satisfies the following expression (7), where $w_{1AVE}$ is the average of the circumferential length $w_1$ (see FIGS. 7A and 7B) along the blade profile of a portion, from the leading edge 24 to the first end portion 32, of the anti-erosion layer 30 in the range of the rotational radius position r of the wind turbine blade 2 of at least 0.7R and not more than 1.0R.

(Expression 7)

$$w_{1AVE}/R \geq 4.0 \times 10^{-4} \tag{7}$$

As depicted in FIG. 6, if the wind turbine blade 2 has R=80 m, the average $w_{1AVE}$ of the circumferential length $w_1$ of a portion, from the leading edge 24 to the first end portion 32, of the anti-erosion layer 30 along the blade profile may satisfy an expression $w_{1AVE} \geq 4.0 \times 10^{-4} \times 80 \times 1000 = 32$ mm, in the range of the rotational radius position r satisfying $0.7 \leq R \leq 1.0$ (i.e., 56 m≤r≤80 m from the hub center).

With the above configuration, in the outer 30% range of the rotational radius from the blade tip portion 22, the first end portion of the anti-erosion layer 30 on the suction surface 26 has the circumferential length $w_1$ along the blade profile from the leading edge 24 satisfying an expression $w_{1AVE}/R \geq 4.0 \times 10^{-4}$ at the average $w_{1AVE}$, and thereby the anti-erosion layer 30 can appropriately prevent erosion of the blade body portion 20 due to collision with the foreign substance Rd that flows with wind, also on the suction strike 26.

In some embodiments, the anti-erosion layer 30 extends from the first end portion 32 on the suction surface 26 to the second end portion 34 on the pressure surface 27 in a cross section orthogonal to the blade spanwise direction, and may be configured such that $w_{1AVE}$ satisfies the following expression (8), where $w_{1AVE}$ is the average of the circumferential length $w_1$ (see FIGS. 7A and 7B) of a portion, from the leading edge 24 to the first end portion 32, of the anti-erosion layer 30 along the blade profile in the range of the rotational radius position r of the wind turbine blade 2 of at least 0.55R and not more than 1.0R.

(Expression 8)

$$w_{1AVE}/R \geq 2.0 \times 10^{-4} \tag{8}$$

As depicted in FIG. 6, if the wind turbine blade 2 has R=80 m, the average $w_{1AVE}$ of the circumferential length $w_1$ of a portion, from the leading edge 24 to the first end portion 32, of the anti-erosion layer 30 along the blade profile may satisfy an expression $w_{1AVE} \geq 2.0 \times 10^{-4} \times 80 \times 1000 = 16$ mm, in the range of the rotational radius position r satisfying an expression $0.55 \leq R \leq 1.0$ (i.e., 44 m≤r≤80 m from the hub center).

With the above configuration, in the outer 45% range of the rotational radius from the blade tip portion 22, the first end portion 32 of the anti-erosion layer 30 on the suction surface 26 has the circumferential length $w_1$ along the blade profile from the leading edge 24 satisfying an expression $w_{1AVE}/R \geq 2.0 \times 10^{-4}$ at the average $w_{1AVE}$, and thereby the anti-erosion layer 30 can appropriately prevent erosion of the blade body portion 20 due to collision with the foreign substance Rd that flows with wind, also on the suction surface 26.

In some embodiments, the anti-erosion layer 30 extends from the first end portion 32 on the suction surface 26 to the second end portion 34 on the pressure surface 27 in a cross section orthogonal to the blade spanwise direction, and may be configured such that $w_{1AVE}$ satisfies the following expression (9), where $w_{1AVE}$ is the average of the circumferential length $w_1$ (see FIGS. 7A and 7B) of a portion, from the leading edge 24 to the first end portion 32, of the anti-erosion layer 30 along the blade profile in the range of the rotational radius position r of the wind turbine blade 2 of at least 0.55R and not more than 1.0R.

(Expression 9)

$$w_{1AVE}/R \geq 9.0 \times 10^{-4} \tag{9}$$

As depicted in FIG. 6, if the wind turbine blade 2 has R=80 m, the average $w_{1AVE}$ of the circumferential length $w_1$ of a portion, from the leading edge 24 to the first end portion 32, of the anti-erosion layer 30 along the blade profile may satisfy an expression $w_{1AVE} \geq 9.0 \times 10^{-4} \times 80 \times 1000 = 72$ mm, in the range of the rotational radius position r satisfying an expression $0.55 \leq R \leq 1.0$ (i.e., 44 m≤r≤80 m from the hub center).

With the above configuration, in the outer 45% range of the rotational radius from the blade tip portion 22, the first end portion 32 of the anti-erosion layer 30 on the suction surface 26 has the circumferential length $w_1$ along the blade profile from the leading edge 24 satisfying an expression $w_{1AVE}/R \geq 9.0 \times 10^{-4}$ at the average $w_{1AVE}$, and thereby the anti-erosion layer 30 can prevent, even more appropriately, erosion of the blade body portion 20 due to collision with the foreign substance Rd that flows with wind, also on the suction surface 26.

In some embodiments, the anti-erosion layer 30 extends from the first end portion 32 on the suction surface 26 to the second end portion 34 on the pressure surface 27 in a cross section orthogonal to the blade spanwise direction, and may be configured such that $w_{1AVE}$ satisfies the following expression (10) at any position in the blade spanwise direction, where $w_{1AVE}$ is the average of the circumferential length $w_1$ (see FIGS. 7A and 7B) of a portion, from the leading edge 24 to the first end portion 32, of the anti-erosion layer 30 along the blade profile.

(Expression 10)

$$w_{1AVE}/R \geq 1.0 \times 10^{-3} \tag{10}$$

As depicted in FIG. 6, if the wind turbine blade 2 has R=80 m, the average $w_{1AVE}$ of the circumferential length $w_1$ of a portion, from the leading edge 24 to the first end portion 32, of the anti-erosion layer 30 along the blade profile may satisfy an expression $w_{1AVE} \geq 1.0 \times 10^{-3} \times 80 \times 1000 = 80$ mm, at any position in the blade spanwise direction.

With the above configuration, at any position in the blade spanwise direction, the first end portion 32 of the anti-erosion layer 30 on the suction surface 26 has the circumferential length $w_1$ along the blade profile from the leading edge 24 satisfying an expression $w_{1AVE}/R \geq 1.0 \times 10^{-3}$ at the average $w_{1AVE}$, and thereby the anti-erosion layer 30 can more appropriately prevent erosion of the blade body portion 20 due to collision with the foreign substance Rd that flows with wind, also on the suction surface 26.

Figure 8:
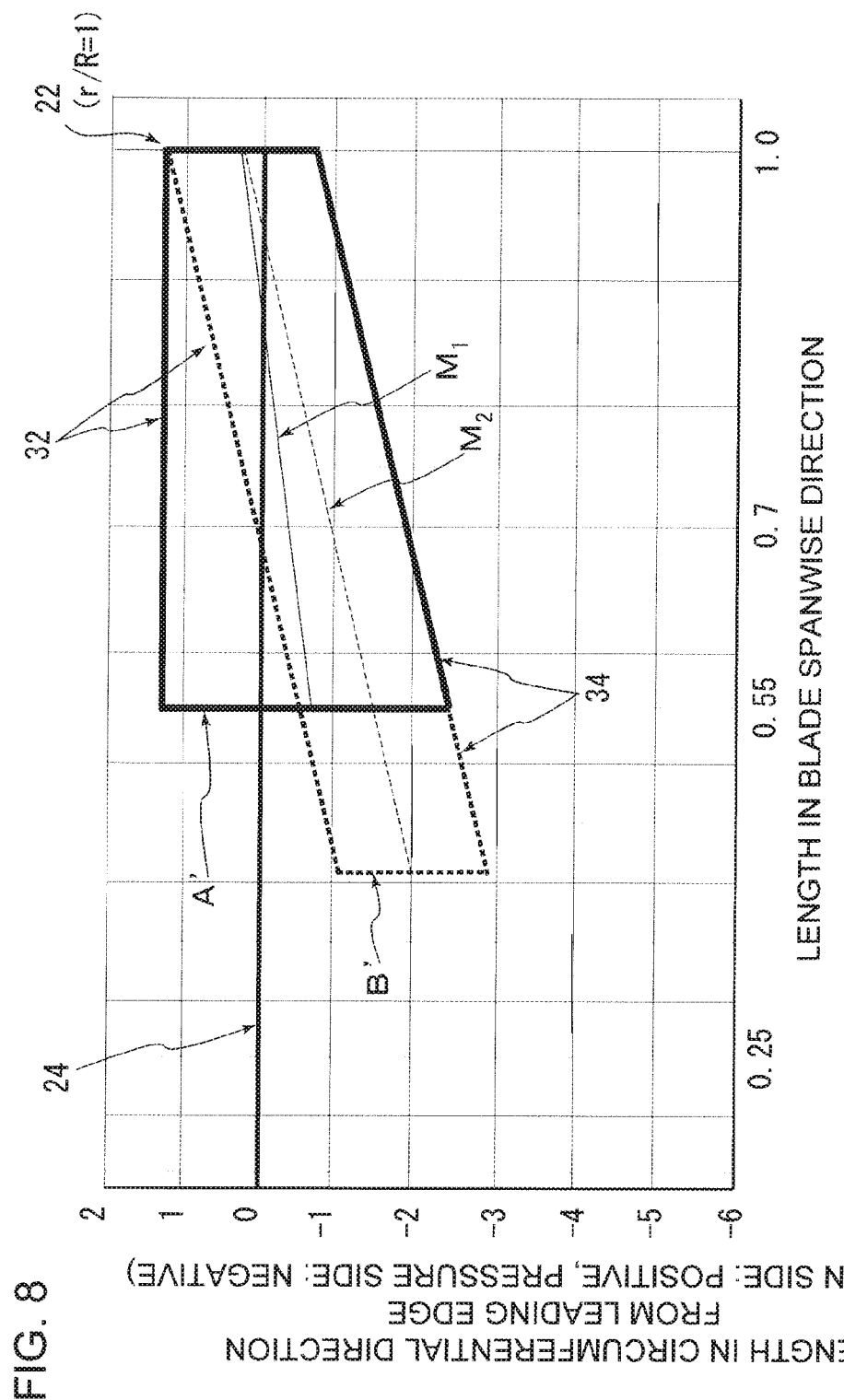
FIG. 8 is a schematic diagram showing an application range of an anti-erosion layer according to another embodiment.

The center point M of the anti-erosion layer 30 in the circumferential length direction along the blade profile needs to be offset toward the pressure surface 27 only in a part of the extending range of the anti-erosion layer 30 in the blade spanwise direction. For instance, the center point M does not need to be offset toward the pressure surface 27 in another part of the anti-erosion layer 30 in the blade spanwise direction, or may be offset toward the suction surface 26 as in the application patterns A' and B' shown in FIG. 8.

Further, the anti-erosion layer 30 may be formed by applying or attaching a single layer or more than one layer.

For instance, one layer may be applied or attached in one of the application patterns A to C shown in FIG. 6, and then the next layer may be applied or attached in another pattern. Alternatively, a plurality of layers may be applied or attached over the range of the same application pattern (e.g. the application pattern A) several times, for instance, to apply or attach a plurality of anti-erosion layers 30 over the same range.

Figure 9:
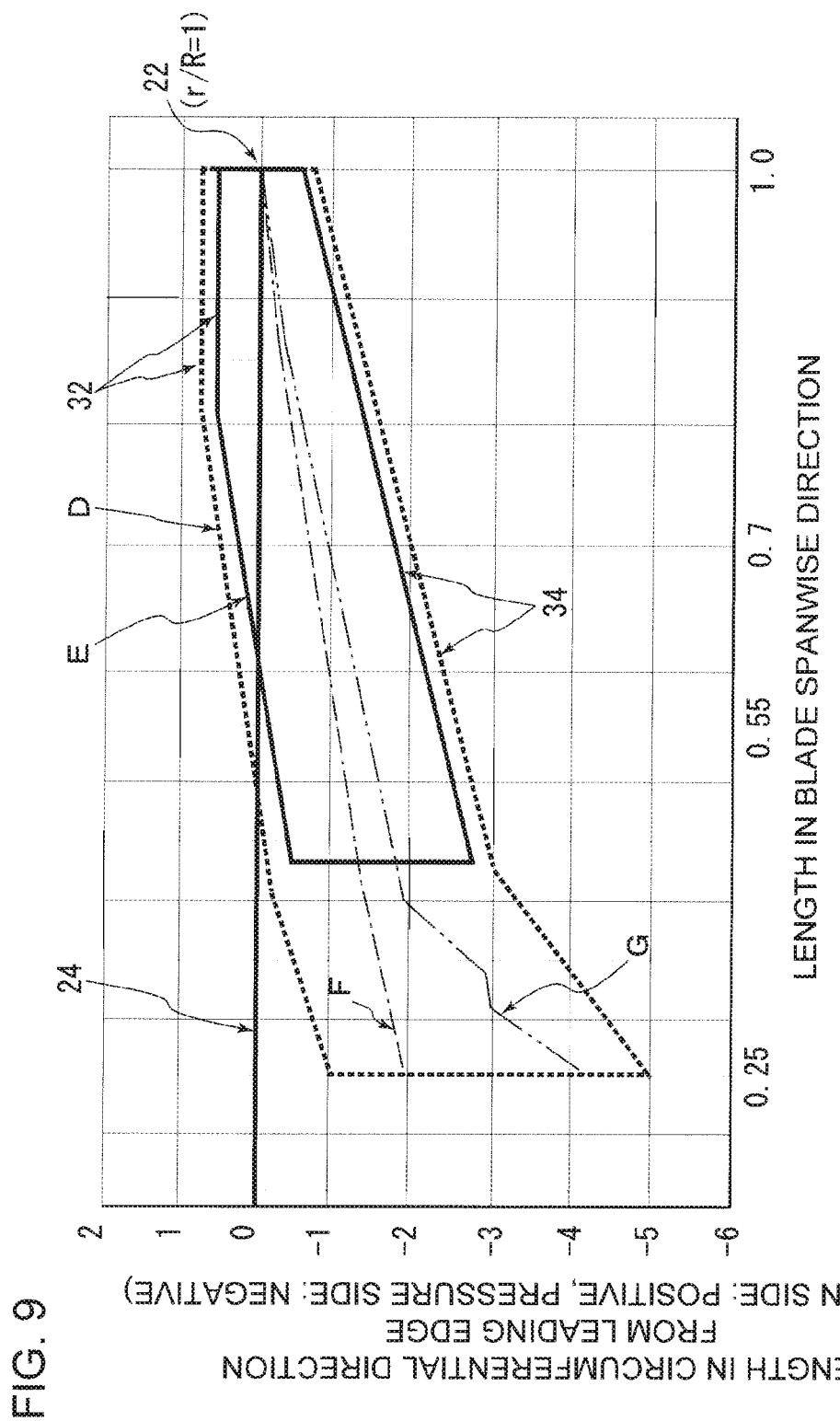
FIG. 9 is a schematic diagram showing an application range of an anti-erosion layer according to another embodiment.

In another embodiment, for instance as depicted in FIG. 9, the anti-erosion layer 30 may be formed to have a predetermined circumferential length along the blade profile toward the leading edge 24 and toward the trailing edge 25 with reference from a stagnation point F at the optimum tip-speed ratio or from a stagnation point G upon reaching the rated output. In the example shown in FIG. 9, for instance, the first layer of the anti-erosion layer 30 may be applied or attached over the range of the application pattern D, and then the second layer of the anti-erosion layer 30 may be applied or attached over the range of the application pattern E.

According to the configuration shown in the above described embodiments, it is possible to provide the rotor 4 having the wind turbine blade 2 with the center point M of the anti-erosion layer 30 in the circumferential length direction along the blade profile offset toward the pressure surface 27 from the leading edge 24, whereby the anti-erosion layer 30 can protect the "portion on the pressure surface sensitive to the influence from erosion" where the inflow angle of the foreign substance Rd that flows with wind into the wind turbine blade is approximately 90 degrees, as well as the wind turbine power generating apparatus 1 provided with the rotor 4.

Embodiments of the present invention were described in detail above, but the present invention is not limited thereto, and various amendments and modifications may be implemented.

DESCRIPTION OF REFERENCE NUMERALS

1 Wind turbine (wind turbine power generating apparatus)
2 Blade (wind turbine blade)
3 Hub
4 Rotor
5 Main shaft
6 Drivetrain
7 Generator
8 Nacelle
9 Tower
10 Base
20 Blade body portion
21 Blade root portion
22 Blade tip portion
23 Airfoil portion
24 Leading edge
25 Trailing edge
26 Suction surface
27 Pressure surface
30 Anti-erosion layer
32 First end portion
34 Second end portion
A to E Application pattern
F Stagnation point at optimum tip-speed ratio
G Stagnation point at arriving rated output
$M_1$, $M_2$ Center point
Rd Foreign substance

The invention claimed is:

1. A wind turbine blade, comprising:
a blade body portion; and
an anti-erosion layer disposed so as to cover a leading edge of the blade body portion and a pressure side of the blade body portion at a first position along a spanwise direction of the blade body portion and at a second position along the spanwise direction closer to a blade tip of the blade body portion than the first position,
wherein, at the first position, a first center point of the anti-erosion layer in a circumferential length direction along a blade profile in a cross section orthogonal to the spanwise direction is shifted towards the pressure side from the leading edge by a first shift amount, wherein, at a second position, a second center point of the anti-erosion layer in the circumferential length direction along the blade profile in the cross section orthogonal to the spanwise direction is shifted towards the pressure side from the leading edge by a second shift amount, and wherein the first shift amount is greater than the second shift amount.

2. The wind turbine blade according to claim 1, wherein a circumferential length of the anti-erosion layer along the blade profile is greater at a first position in the spanwise direction than at a second position which is closer to a blade tip than the first position in the spanwise direction.

3. The wind turbine blade according to claim 1, wherein an average $\Delta x_{AVE}$ of a shift amount, from the leading edge toward the pressure side, of a center point of the anti-erosion layer in the circumferential length direction along the blade profile satisfies an expression $\Delta x_{AVE}/R \geq 2.0 \times 10^{-4}$, in a range of a rotational radius position r of the wind turbine blade of at least 0.7R and not more than 1.0R, where R is a rotational radius position of a blade tip of the wind turbine blade.

4. The wind turbine blade according to claim 1, wherein an average $\Delta x_{AVE}$ of a shift amount, from the leading edge toward the pressure side, of a center point of the anti-erosion layer in the circumferential length direction along the blade profile satisfies an expression $\Delta x_{AVE}/R \geq 3.0 \times 10^{-4}$, in a range of a rotational radius position r of the wind turbine blade of at least 0.55R and not more than 1.0, where R is a rotational radius position of a blade tip of the wind turbine blade.

5. The wind turbine blade according to claim 1, wherein an average $\Delta x_{AVE}$ of a shift amount, from the leading edge toward the pressure side, of a center point of the anti-erosion layer in the circumferential length direction along the blade profile satisfies an expression $\Delta x_{AVE}/R \geq 4.5 \times 10^{-4}$, in a range of a rotational radius position r of the wind turbine blade of at least 0.25R and not more than 1.0R, where R is a rotational radius position of a blade tip of the wind turbine blade.

6. The wind turbine blade according to claim 1,
wherein the anti-erosion layer extends from a first end portion to a second end portion which is on the pressure side, in the cross section orthogonal to the spanwise direction, and
wherein a circumferential length $W_{2tip}$ of a portion of the anti-erosion layer along the blade profile, the portion extending from the leading edge to the second end portion, satisfies an expression $W_{2tip}/R \geq 6.0 \times 10^{-4}$, where R is a rotational radius position of a blade tip of the wind turbine blade in a vicinity of a blade tip of the wind turbine blade.

7. The wind turbine blade according to claim 1,
wherein the anti-erosion layer extends from a first end portion to a second end portion which is on the pressure side, in the cross section orthogonal to the spanwise direction, and
wherein an average $W_{2AVE}$ of a circumferential length of a portion of the anti-erosion layer along the blade profile, the portion extending from the leading edge to the second end portion, satisfies an expression $w_{2AVE}/R \geq 1.5 \times 10^{-3}$, in a range of a rotational radius position r of the wind turbine blade of at least 0.55R and not more than 0.6R, where R is a rotational radius position of a blade tip of the wind turbine blade.

8. The wind turbine blade according to claim 1,
wherein the anti-erosion layer extends from a first end portion to a second end portion which is on the pressure side, in the cross section orthogonal to the spanwise direction, and
wherein an average $W_{2AVE}$ of a circumferential length of a portion of the anti-erosion layer along the blade profile, the portion extending from the leading edge to the second end portion, satisfies an expression $w_{2AVE}/R \geq 2.1 \times 10^{-3}$, in a range of a rotational radius position r of the wind turbine blade of at least 0.2R and not more than 0.3R, where R is a rotational radius position of a blade tip of the wind turbine blade.

9. The wind turbine blade according to claim 1,
wherein the anti-erosion layer extends from a first end portion on a suction side to a second end portion on the pressure side, in the cross section orthogonal to the spanwise direction, and
wherein an average $w_{1AVE}$ of a circumferential length of a portion of the anti-erosion layer along the blade profile, the portion extending from the leading edge to the first end portion, satisfies an expression $w_{1AVE}/R \geq 4.0 \times 10^{-4}$, in a range of a rotational radius position r of the wind turbine blade of at least 0.7R and not more than 1.0R, where R is a rotational radius position of a blade tip of the wind turbine blade.

10. The wind turbine blade according to claim 1,
wherein the anti-erosion layer extends from a first end portion on a suction side to a second end portion on the pressure side, in the cross section orthogonal to the spanwise direction, and
wherein an average $w_{1AVE}$ of a circumferential length of a portion of the anti-erosion layer along the blade profile, the portion extending from the leading edge to the first end portion, satisfies an expression $w_{1AVE}/R \geq 2.0 \times 10^{-4}$, in a range of a rotational radius position r of the wind turbine blade of at least 0.55R and not more than 1.0R, where R is a rotational radius position of a blade tip of the wind turbine blade.

11. The wind turbine blade according to claim 1,
wherein the anti-erosion layer extends from a first end portion on a suction side to a second end portion on the pressure side, in the cross section orthogonal to the spanwise direction, and
wherein an average $w_{1AVE}$ of a circumferential length of a portion of the anti-erosion layer along the blade profile, the portion extending from the leading edge to the first end portion, satisfies an expression $w_{1AVE}/R \geq 9.0 \times 10^{-4}$, in a range of a rotational radius position r of the wind turbine blade of at least 0.55R and not more than 1.0R, where R is a rotational radius position of a blade tip of the wind turbine blade.

12. The wind turbine blade according to claim 1,
wherein the anti-erosion layer extends from a first end portion on a suction side to a second end portion on the pressure side, in the cross section orthogonal to the spanwise direction, and
wherein an average $w_{1AVE}$ of a circumferential length of a portion of the anti-erosion layer along the blade profile, the portion extending from the leading edge to the first end portion, satisfies an expression $w_{1AVE}/R \geq 1.0 \times 10^{-3}$, at any position in the spanwise direction.

13. A wind turbine rotor, comprising:
the wind turbine blade according to claim 1; and
a hub to which a blade root of the wind turbine blade is connected.

14. A wind turbine power generating apparatus, comprising:
the wind turbine rotor according to claim 13; and
a generator for generating electric power from rotational energy of the wind turbine rotor.

* * * * *